(12) United States Patent
Pream et al.

(10) Patent No.: US 9,280,422 B2
(45) Date of Patent: Mar. 8, 2016

(54) DYNAMIC DISTRIBUTION OF CODE WORDS AMONG MULTIPLE DECODERS

(71) Applicant: Seagate Technology LLC, Cupertino, CA (US)

(72) Inventors: Jeffrey John Pream, Berthoud, CO (US); Ara Patapoutian, Hopkinton, MA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/020,630

(22) Filed: Sep. 6, 2013

(65) Prior Publication Data

US 2015/0074488 A1    Mar. 12, 2015

(51) Int. Cl.
*G11C 29/00* (2006.01)
*G06F 11/10* (2006.01)

(52) U.S. Cl.
CPC .......... *G06F 11/108* (2013.01); *G06F 11/1048* (2013.01)

(58) Field of Classification Search
CPC ............ H03M 7/6005; H03M 7/6047; H03M 13/2981; H03M 13/2978; H03M 13/6343; H03M 13/1105; H03M 7/6023; G11B 20/10222; G11B 20/18; G11B 2220/2516; G11B 2020/10703
See application file for complete search history.

(56) References Cited

U.S. PATENT DOCUMENTS

| 5,381,145 | A * | 1/1995 | Allen et al. ................... 341/107 |
|---|---|---|---|
| 6,647,489 | B1 | 11/2003 | Col et al. |
| 6,833,831 | B2 | 12/2004 | Emberling et al. |
| 6,839,830 | B2 | 1/2005 | Liu |
| 8,117,620 | B2 * | 2/2012 | Raghunath et al. ........... 718/105 |
| 8,156,502 | B1 | 4/2012 | Blanding |
| 8,347,194 | B2 * | 1/2013 | No et al. ....................... 714/785 |
| 8,438,434 | B2 | 5/2013 | Engin |
| 8,667,377 | B1 * | 3/2014 | Mazahreh et al. ............ 714/784 |
| 2001/0047501 | A1 * | 11/2001 | Sindhushayana et al. .... 714/755 |
| 2008/0118229 | A1 * | 5/2008 | Bliss ............................. 386/123 |
| 2008/0126812 | A1 | 5/2008 | Ahmed et al. |
| 2009/0328048 | A1 | 12/2009 | Khan et al. |
| 2011/0141889 | A1 | 6/2011 | Pang et al. |
| 2011/0231636 | A1 | 9/2011 | Olson et al. |
| 2013/0007556 | A1 * | 1/2013 | Patapoutian et al. ......... 714/755 |
| 2013/0290953 | A1 | 10/2013 | Li et al. |

FOREIGN PATENT DOCUMENTS

EP           0479432        9/1991

OTHER PUBLICATIONS

Jha et al., "Adaptive Resource Allocation for Embedded Parallel Applications", IEEE, Aug. 1996, pp. 425-431.*
File History for U.S. Appl. No. 14/020,624 as retrieved from the U.S. Patent and Trademark Office on Oct. 19, 2015, 121 pages.

(Continued)

*Primary Examiner* — Guerrier Merant
(74) *Attorney, Agent, or Firm* — Hollingsworth Davis, LLC

(57) ABSTRACT

A device comprising a data transfer channel is configured to transfer data between multiple memory devices and a host device. The channel includes multiple decoders and a buffer coupled between the multiple memory devices and the multiple decoders. The buffer is configured to store code words received from the memory devices. Channel control logic is configured to determine availability of one or more of the multiple decoders and to distribute the code words to the one or more decoders based on decoder availability.

20 Claims, 8 Drawing Sheets

(56) References Cited

OTHER PUBLICATIONS

Guidotti et al., "Millimeter-Wave Main Memory-to-Processor Data Bus," 2010 11$^{th}$ International Conference on Electronic Packaging Technology & High Density Packaging, 2010 pp. 1280-1287.

Zhang et al., "Integrating Resource Consumption and Allocation for Infrastructure Resources on-Demand," 2010 IEEE 3$^{rd}$ International Conference on Cloud Computing, 2010, pp. 75-82.

Koutras et al., "Adaptive dynamic memory allocators by estimating application workloads," 2012 International Conference on Embedded Computer Systems (SAMOS), 2012, pp. 252-259.

\* cited by examiner

DYNAMIC DISTRIBUTION OF CODE WORDS AMONG MULTIPLE DECODERS

SUMMARY

Some embodiments involve a device comprising a data transfer channel configured to transfer data between multiple memory devices and a host device. The channel includes multiple decoders and a buffer coupled between the multiple memory devices and the multiple decoders. The buffer is configured to store code words received from the memory devices. Channel control logic is configured to determine availability of one or more of the multiple decoders and to distribute the code words to the one or more decoders based on decoder availability.

Some embodiments involve a system comprising multiple memory devices and a data transfer channel configured to transfer data between the multiple memory devices and a host device. The channel includes multiple decoders and a buffer. The buffer is coupled between the multiple memory devices and the multiple decoders and is configured to store code words from the memory devices. The system includes channel control logic configured to control the channel. The channel control logic determines availability of one or more of the multiple decoders and distributes the code words to the one or more decoders based on decoder availability.

Some embodiments are directed to a method. According to the method, code words are transferred from multiple memory devices to a buffer. The availability of one or more of multiple decoders is determined. The code words are distributed to the one or more decoders in accordance with decoder availability.

These and other features and aspects of various embodiments may be understood in view of the following detailed discussion and accompanying drawings.

BRIEF DESCRIPTION OF THE DRAWINGS

The same reference numbers may be used to identify like components in multiple figures.

DETAILED DESCRIPTION

Figure 1A:
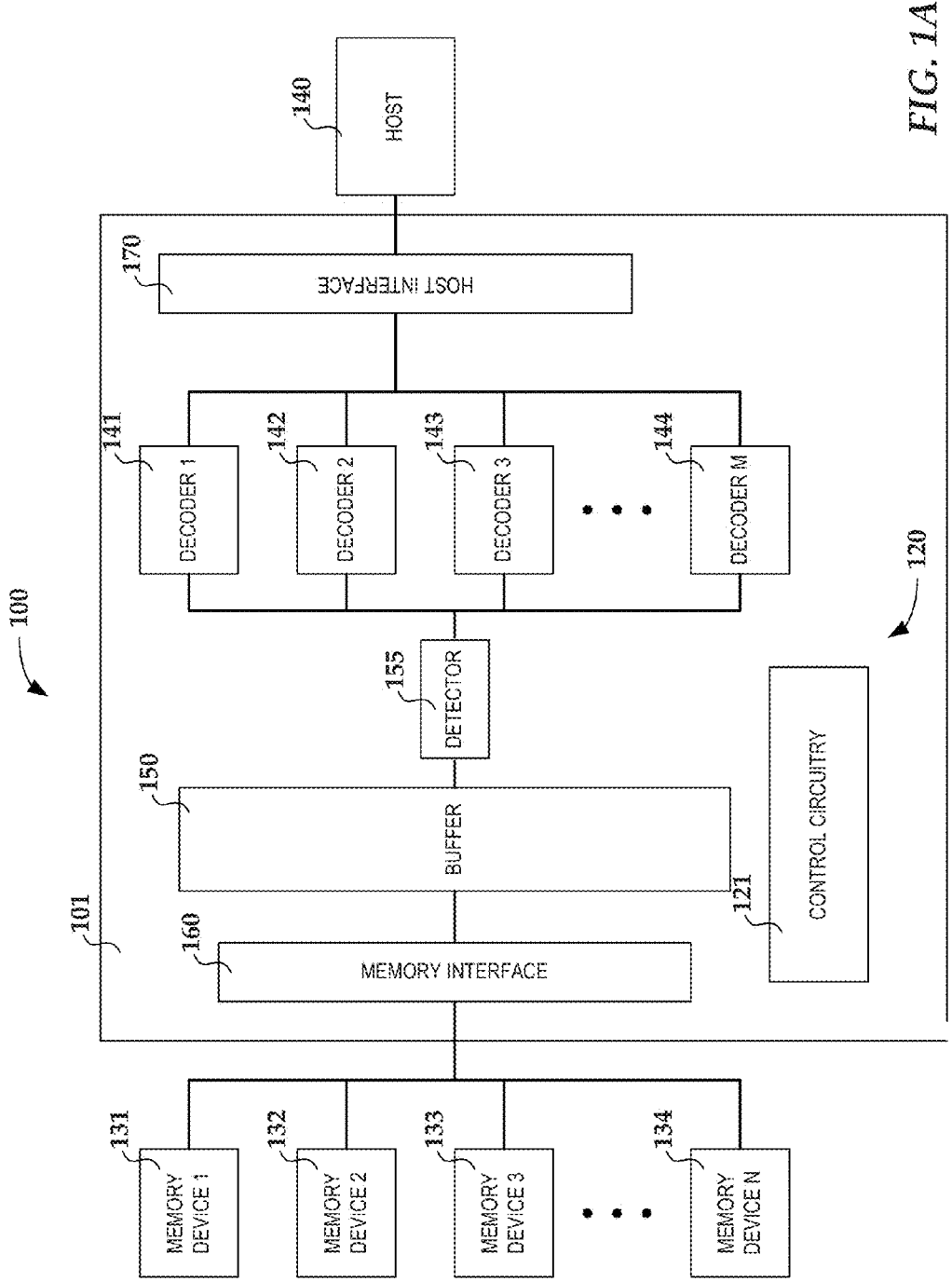
FIG. 1A is a block diagram of a data transfer channel system configured to transfer data between multiple memory devices and a host in accordance with some embodiments.

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

Dynamic distribution of code words from multiple memory devices to any of multiple decoders in a data transfer channel can be implemented to enhance efficient utilization of channel resources. A buffer is arranged to store code words incoming from the memory devices. A code word from any of the memory devices can be distributed from the buffer to any decoder that is available to decode the code word. In some embodiments, the code words can be prioritized and distributed according to the priority. The prioritization of the code words can be based on a target latency and an estimated latency. The target latency can be determined using priority information provided by a host device. The estimated latency can be determined using a quality hint provided by the host device and/or decoder statistics. The quality hint can be based on information about the code word or about the memory cells that store the code word. Decoders can be dynamically enabled or disabled in response to changes in the work load of the data transfer channel. Disabled decoders are placed in a low power mode. If no decoders are available to decode an incoming code word, a disabled decoder can be re-enabled.

In some embodiments, some of the decoders can perform hard decoding and some of the decoders can perform soft decoding. If both hard and soft decoding is implemented, the same circuitry can be used as a detector for both the decoders implementing hard decoding and for the decoders implementing soft decoding. When a detector for hard decoding is implemented, the detector circuitry operates on a single bit input (either a 0 or a 1) and has two possible outputs. When a detector for soft decoding is implemented, the detector circuitry has a multi-bit input and a multi-bit output that can have an associated log likelihood ratio (LLR). The same circuitry can be used as a detector for both the decoders implementing hard decoding and the decoders implementing soft decoding by changing look-up table values.

The code words can be distributed to the hard and soft decoders based on the quality information and/or other factors. For example, code words having a lower likelihood of errors may be distributed to a hard decoder for hard decoding, whereas code words having a higher likelihood of errors may be distributed to a soft decoder for soft decoding. For example, consider a data transfer channel used with a flash memory. A hard decoder can be used if the data is read from the flash once. A soft decoder can be used if data is read from the flash multiple times with different thresholds. Thus, the other factors referred to above can include whether the data was read from the flash a single time or multiple times. In some cases, the decoding can start with hard decoding and if hard decoding fails, additional reads can be performed and soft decoding can be implemented using the multiple reads. In some cases, if the quality information indicates a priori that hard decoding is not likely to be successful, the multiple reads can be performed and soft decoding implemented without first attempting hard decoding.

FIG. 1A is a block diagram of a data channel system 100 that includes a data transfer channel 120 and channel control circuitry 121. In this particular implementation, the data transfer channel 120 is arranged to recover data from multiple memory devices 131-134, which can be solid state non-volatile memory devices, such as flash memory. For example, in some implementations, each memory device 131-134 can be a multi-plane, multi-die, multiple level cell (MLC) NAND flash device. In general, the memory devices 131-134 can be any type of memory.

In the example of FIG. 1A, the data transfer channel 120 and channel control circuitry 121 are disposed in a memory controller 101 that couples the N memory devices, memory devices 1-N 131, 132, 133, 134 through a buffer 150 and detector 155 to M decoders, decoders 1-M 141, 142, 142, 144. The decoders 141-144 can be independently controlled for decode operations and can be independently enabled or disabled for power management.

The decoders 141-144 can be any type of decoder and/or need not be all the same type of decoder. For example, some of the decoders 141-144 may be soft decoders and some of the decoders 141-144 may be hard decoders. The controller 101 includes a memory interface 160 configured to facilitate the transfer of data between the controller 101 and the multiple memory devices 131-134. The controller 101 includes a host interface 170 configured to facilitate the transfer of data between the controller 101 and the host 140. In various configurations, the data channel system 100 can include M decoders and N memory devices, where M and N can be any number, and in some implementations M<N.

The data recovery process includes transferring data in the form of code words from at least one of the memory devices 131-134 via the memory interface 160 into the buffer 150. The data transfer channel 120 may include a single buffer 150 with the capacity to store incoming data from all of the memory devices 1-N 131-134. The channel control circuitry 121 can route the code words stored in the buffer 150 to any of the M decoders 1-M 141-144 to be decoded. The decoded data is transferred to the host 140 via the host interface 170.

Figure 1B:
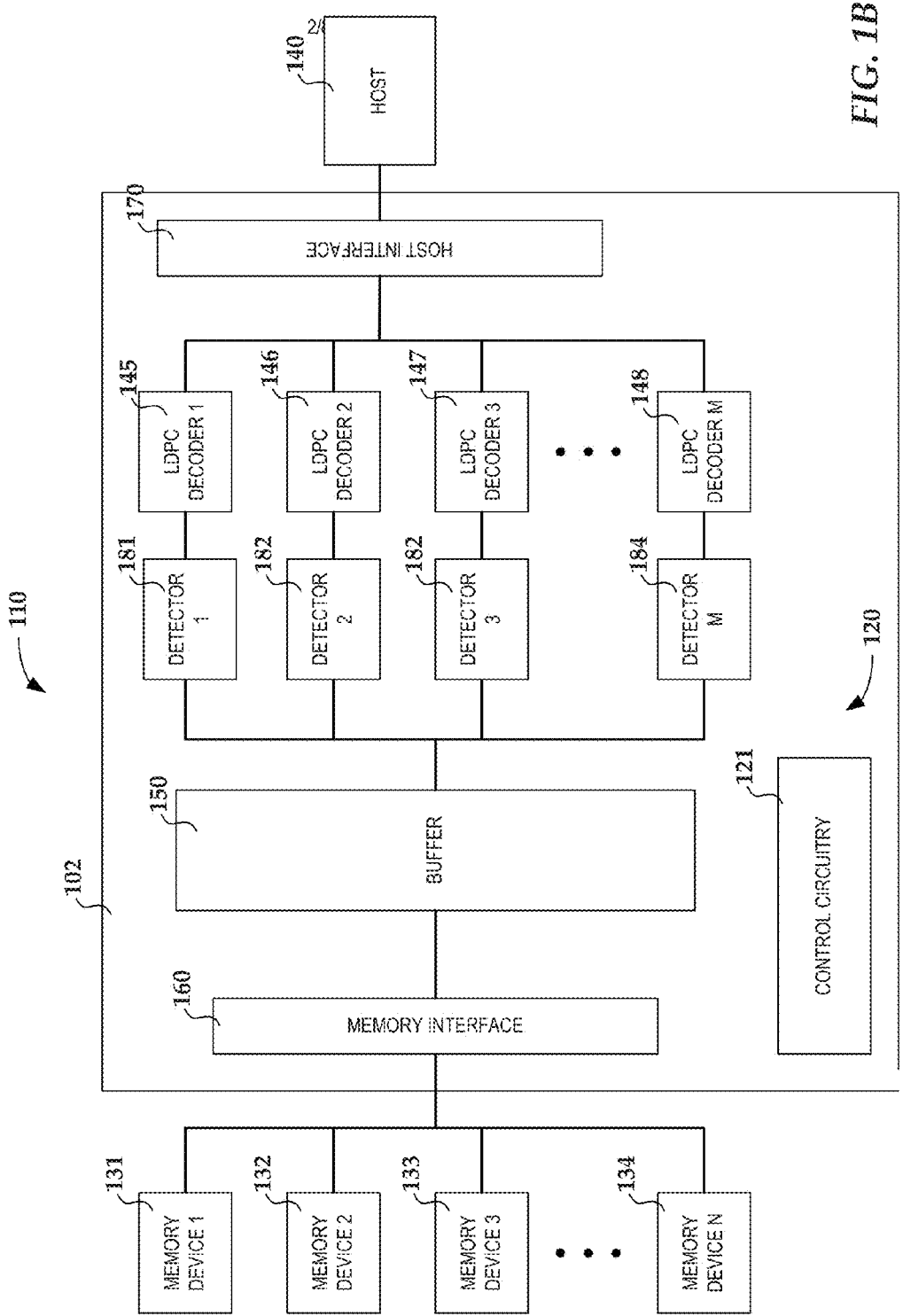
FIG. 1B is a block diagram of a data transfer channel system configured to transfer data between multiple memory devices and a host that includes multiple low density parity check (LDPC) decoders in accordance with some embodiments.

FIG. 1B illustrates a data channel system 110 in accordance with another embodiment. In the particular configuration shown in FIG. 1B, the decoders 145-148 are low density parity check (LDPC) decoders that are configured to operate on soft data. In this embodiment, each decoder 145-148 has an associated detector 181-184. The detectors 181-184 are configured to supply soft information to the LDPC decoders 145-148. The soft information includes both binary bit data (1s and 0s) and reliability information. The LDPC decoders 145-148 can take a variable amount of time to decode the incoming code words, and the use of dynamic distribution of code words to available decoders facilitates data throughput. Enhanced data throughput can be achieved using dynamic distribution of code words because incoming code words from any of the memory devices 131-134 can be routed to any available decoder 145-148 without having to wait for any particular decoder to complete its decode process.

Figure 2:
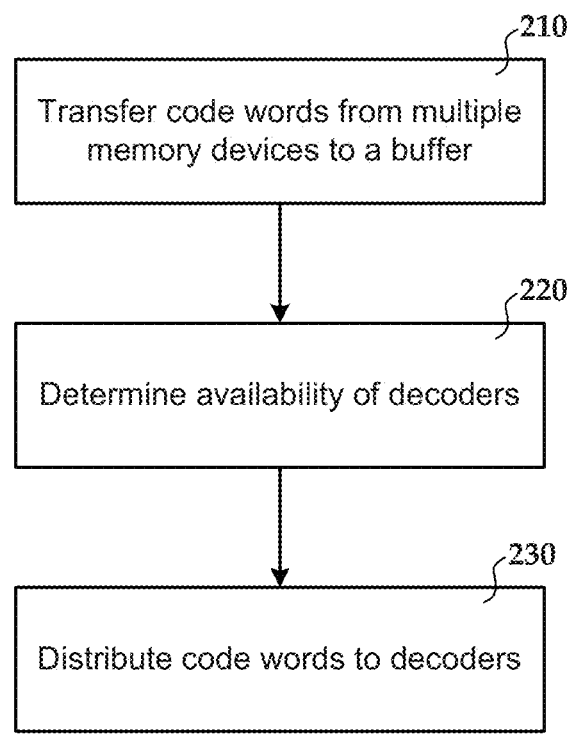
FIG. 2 is a flow diagram illustrating a method of dynamically distributing code words among multiple decoders in accordance with some embodiments.

The data channel systems 100, 110 shown in in FIGS. 1A and 1B, for example, can be operated according to the flow diagram shown in FIG. 2. Code words are transferred 210 from the multiple memory devices and are stored into the buffer. The channel control circuitry determines 220 the availability of the decoders, distributed code words to the decoders, and issues commands to the decoders to decode the code words. For example, the decoders may be in any of a number of states including an available (ready) state, a busy state, or a disabled state (e.g., light sleep mode, deep sleep mode, and shut down mode). One or more of the decoders may be busy decoding previously obtained code words. One or more of the decoders may be available and ready to accept code words for decoding. The channel control circuitry selects one of the available decoders and distributes 230 the code words to the selected decoders. The selected decoders decode the code words and the decoded data is eventually routed to the host device.

Figure 3:
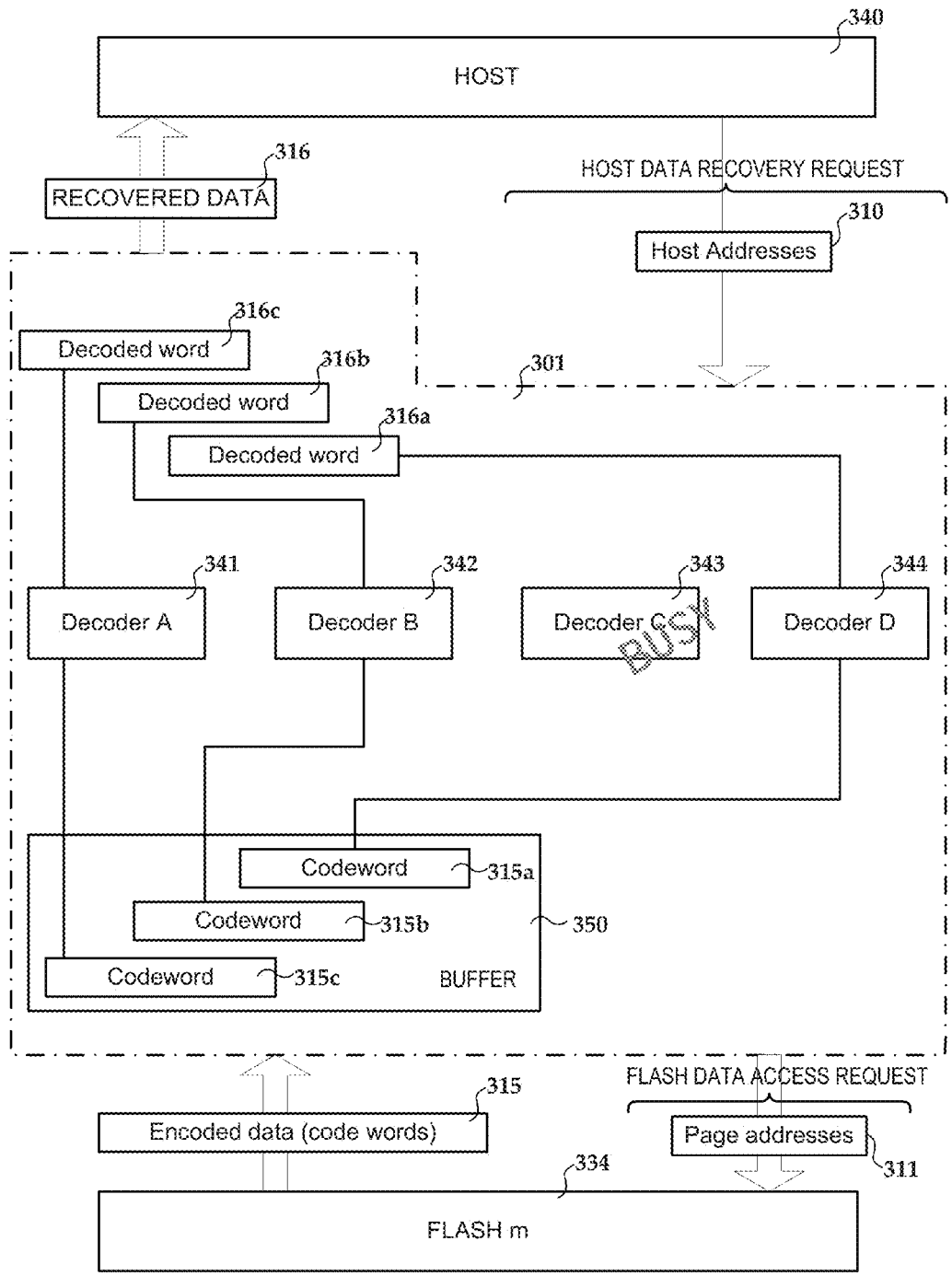
FIG. 3 is a diagram that depicts a data recovery process in accordance with some embodiments.

FIG. 3 is a diagram that depicts a data recovery process in accordance with some embodiments. The host 340 sends a host data recovery request to the memory controller 301. The host data recovery request specifies certain memory locations, e.g., host addresses 310 such as host logical block addresses (LBAs) that are used to determine where the data is located the flash devices. The controller 301 translates the host addresses to page addresses of the appropriate one or more the flash devices, represented as flash m 334 in this example. The controller 301 sends a flash data access request to flash m 334, the flash data access request includes the flash page addresses 311 to be accessed. Flash m 334 responds to the flash data access request by accessing the addressed flash pages and sending the encoded data 315 (code words) stored in the flash pages to the memory controller 301. The incoming code words 315a, 315b, 315c are stored in buffer 350, which can be a single large buffer having capacity to store all the incoming code words provided by all the flash devices in response to flash data access requests.

The channel control circuitry (not shown in FIG. 3) selects the decoders that are used to decode code words 315a, 315b, 315c. The channel control circuitry keeps track of the availability/unavailability of the decoders 341-344. Available decoders are enabled decoders that are available to decode incoming code words. Unavailable decoders are either deactivated (in sleep or shut down mode) or are busy performing a decoding operation. The channel control circuitry can be designed to activate decoders or to deactivate decoders in response to work flow.

As indicated in the example of FIG. 3, the data transfer channel includes four decoders 341, 342, 343, 344, although more or fewer decoders can be used. One of the decoders, decoder C 343, is busy and thus is not available for selection to decode code words 315a, 315b, 315c. Decoders A, B, and D 341, 342, 344 are available to receive a new decoding job. The channel control circuitry distributes code word 315a to decoder D 344, distributes code word 315b to decoder B 342, and distributes code word 315c to decoder A 341. The decoders A, B, D 341, 342, 344 decode the code words 315a, 315b, 315c to provide decoded words 316a, 316b, 316c, respectively. The decoded words 316a, 316b, 316c are transferred to the host as the requested recovered data 316.

In some embodiments, some of the decoders in the data transfer channel may be hard decoders and some of the decoders are soft decoders. The channel control circuitry can be configured to distribute the code words to the hard and soft decoders based on quality and/or priority information. In some implementations, the quality and/or priority information is received from the host, e.g., as a quality hint and/or a priority code that is passed from the host to the memory controller as part of the host data access request.

The priority of the data access requests indicates the urgency with which the host data needs the requested information. The code words associated with a higher priority request can be scheduled so that they are decoded before the code words associated with a lower priority request, even though the lower priority request was received before the higher priority request. Decode time is a primary factor that determines latency through the data transfer channel. In some configurations, the channel control circuitry includes a programmable look up table that converts priority information, e.g., a priority code, received from the host to a target latency for data transfer through the data transfer channel. For example, the channel controller can use the priority code to retrieve a target latency for a host data access request and applies the target latency to each of the code words involved in that data access request.

The quality hint can include information about the code words themselves or about the memory locations where the code words are stored. For example, the code words can be relatively higher code rate code words or can be relatively lower code rate code words, where the code rate represents the number of parity bits that are included in the code word. In general, lower code rates code words have better protection against data errors (higher quality), but may take longer to decode when compared with higher code rate code words.

The quality hint may provide an indication that the requested code words are stored in memory locations that have a relatively higher likelihood of error or are stored in memory locations that have a relatively lower likelihood of error. For example, the likelihood of error may be based on one or more of 1) previous bit error rate of the memory locations, 2) the amount of time that the code words have been stored in the memory locations (retention time), 3) the number of program/erase (P/E) cycles experienced by the memory, or other factors affecting the likelihood of error. In some configurations, the channel control circuitry includes a programmable look up table that can be accessed to convert quality information, e.g., a quality hint, received from the host to an estimated latency for data transfer through the data transfer channel. For example, the channel controller can use the quality hint to retrieve the estimated latency for a host data access request and applies the estimated latency to each of the code words involved in that data access request. The estimated latency determined by the channel control circuitry may also take into account pending workload at each stage of the data transfer channel, for example A data transfer request from the host produces a flash data access request that returns a number of code words that need to be decoded. The code words to be decoded can be grouped into a number of sub-jobs, wherein each sub job includes one or more code words. A prioritized list of the code words that need to be can be maintained by the channel controller. The prioritization of the code words can be determined according to the target latencies and the estimated latencies of the code words with the goal of decoding all code words to complete all sub jobs within their target latencies.

Figure 4:
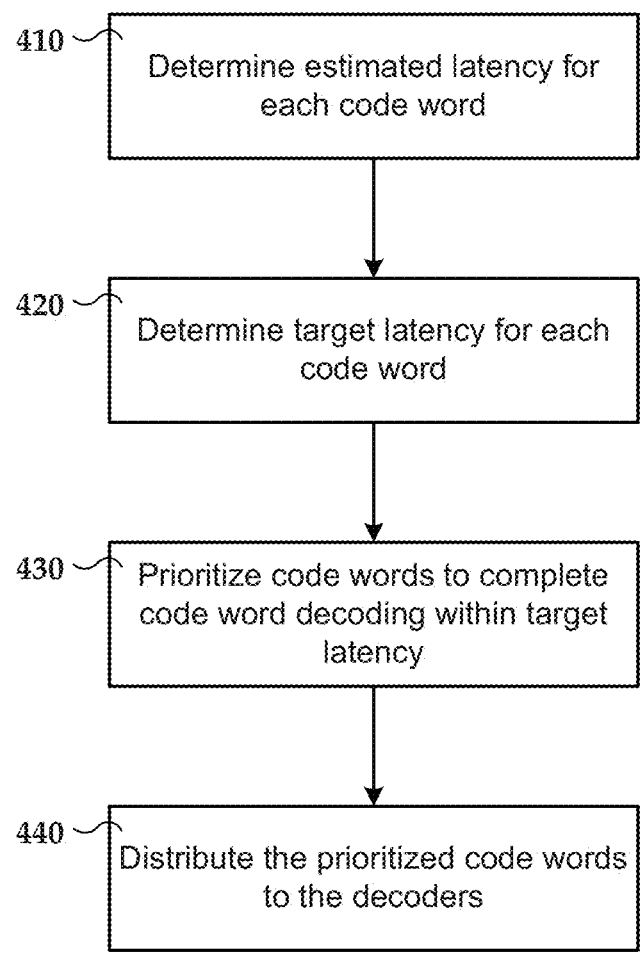
FIG. 4 is a flow diagram of a method of operating a data transfer channel system in accordance some embodiments.

FIG. 4 is a flow diagram that illustrates a process that can be implemented by a data transfer channel and channel control circuitry according to some embodiments. The channel control circuitry determines 410 an estimated latency for each code word, e.g., based on the quality hint received from the host processor. The channel control circuitry determines 420 the target latency for each code word, e.g., based on the priority information received from the host. The code words are prioritized 430 based on the estimated latency and the target latency. The channel control circuitry distributes 440 the prioritized code words to the decoders with the objective of decoding all the code words within their target latencies.

In some implementations, the channel control circuitry can be configured to enable and/or disable decoders based on workflow of data access requests from the host. During periods of low workflow, one or more decoders can be disabled. Disabled decoders may be placed in a low power mode, e.g., sleep mode, or can be deactivated, e.g., shut-off mode. If placed in sleep mode, the decoders can be placed into one of several sleep states, e.g., light sleep or deep sleep, wherein decoders in light sleep mode use more power than decoders in deep sleep mode but can be enabled more quickly than decoders in deep sleep mode. Decoders in deep sleep mode use more power than decoders in shut off mode but can be enabled more quickly than decoders in shut off mode.

As data transfer requests come in from the host, the channel control circuitry may determine that there are not enough enabled decoders to complete decoding the code words within the target latencies of the data transfer requests. If so, and if there are additional decoders that can be enabled, then the channel control circuitry may enable one or more of the decoders, thus bringing the one or more decoders out of light sleep mode, deep sleep mode, or shut off mode, and making them available to accept decoding jobs.

Figure 5:
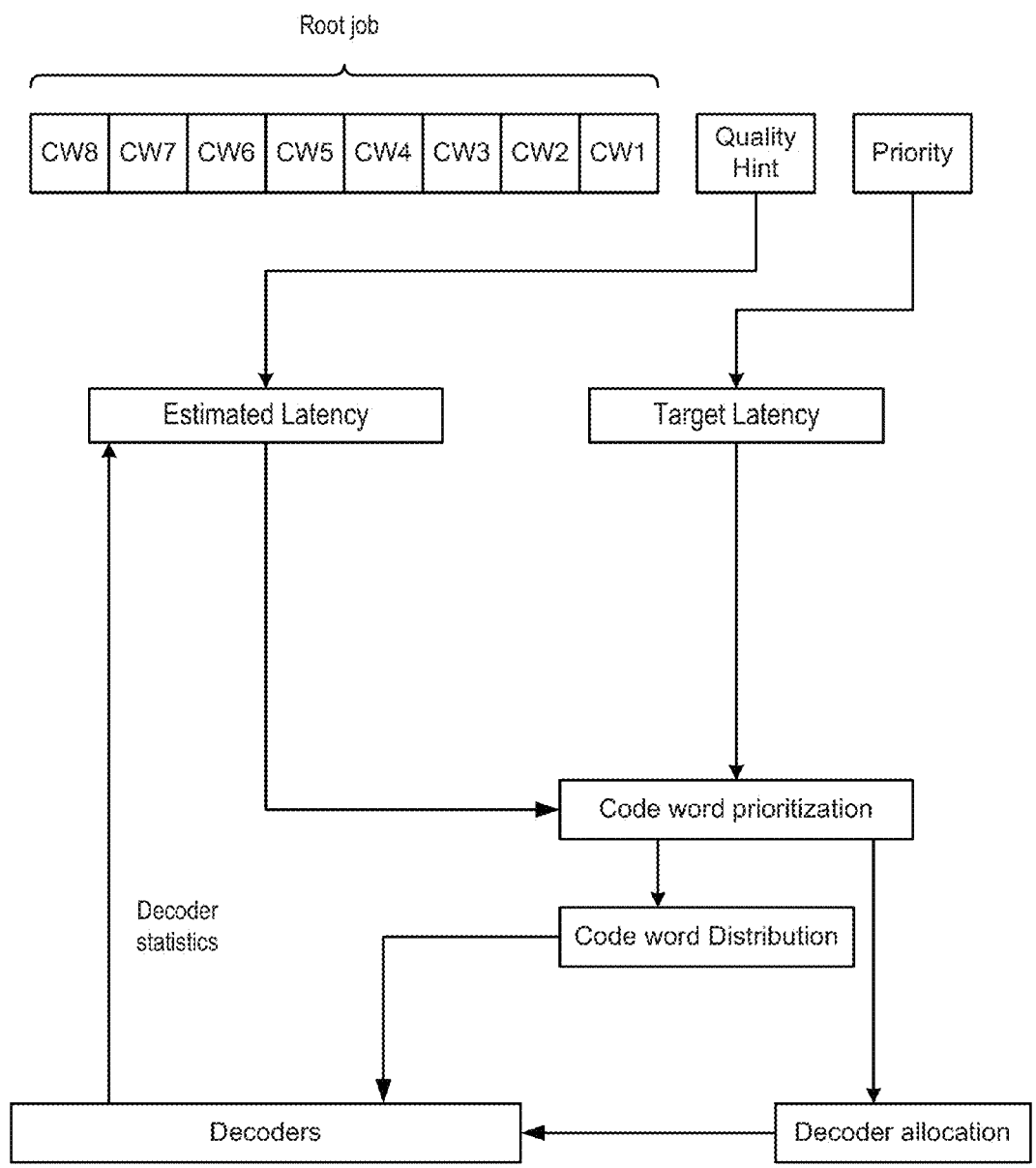
FIG. 5 is a diagram that illustrates the operation of a data transfer channel and channel control circuitry in accordance with some embodiments.

FIG. 5 is a diagram that illustrates the operation of a data transfer channel and channel control circuitry in accordance with some embodiments. Encoded data is received from multiple memory devices coupled to the data transfer channel. As shown in FIG. 5 a root job comprising a number of code words, CW1-CW8 can be received from the memory devices. A quality hint and priority is associated with each root job and the quality hint and priority is applied to each code word of the root job. The channel control circuitry uses the quality hint to determine an estimated latency for the code word, wherein the estimated latency includes the estimated decode time for each code word. Decoder statistics, such as iteration count and/or bit error count, for the previously decoded code words of a root job can be fed back into the estimated latency to adjust the estimated latency closer to the reality of the data quality. The quality feedback may be weighted based on the number of code words in a root job and how may statistical samples have been accumulated. Estimated latency for a code word may be adjusted based on a code word's physical position within the root job's data set.

The channel control circuitry uses the priority to determine the target latency of each code word. The target latency and estimated latency are used to prioritize the code words, where the prioritization is performed with the objective of completing all data transfers for each code word within the target latency for the code word. The prioritize function takes recently updated estimated latency numbers and orders them such that the code words with the highest risk of exceeding their target latency are prioritized over those more likely to complete within their target latency. The priority sorted list of code words is maintained by channel control circuitry. The code words are distributed to the decoders according to the code word prioritization. The decoder allocation function looks at the prioritized list and adjusts the number of enabled decoders to optimally decode all code words within their target latency.

Figure 6:
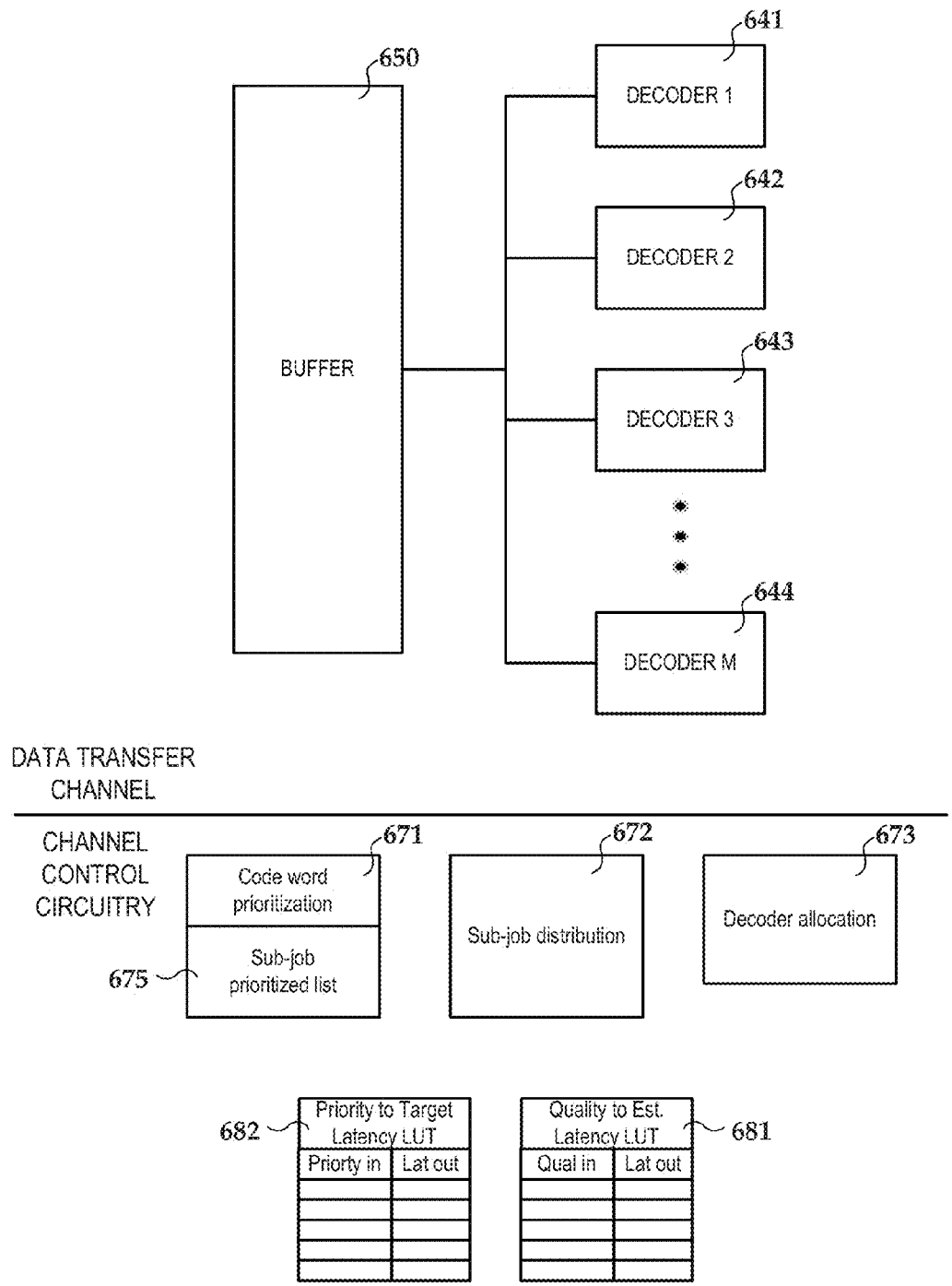
FIG. 6 is a block diagram of components of a data transfer channel and control channel circuitry in accordance with some embodiments.

FIG. 6 is a block diagram of components of a data transfer channel and control channel circuitry. As previously discussed, the data transfer channel includes a buffer 650 of sufficient capacity to store incoming data from multiple memory devices. The buffer 650 serves as the input buffer to multiple decoders 641-644, where in some embodiments, the number of decoders is less than the number of memory devices.

The channel control circuitry is configured to provide functionality for a number of tasks including prioritization 671 of code words, distribution 672 of incoming code words to the decoders and allocation 673 of decoders to the data transfer channel. The channel control circuitry can include a first programmable look up table 681 that uses the quality hint from the host as an index to an estimated latency for the code word. The channel control circuitry can include a second programmable look up table 682 that uses the priority code from the host as an index to a target latency for the code word. The channel control circuitry prioritizes the code words into a prioritized list 675 using the estimated latency and the target latency and distributes the code words based on the prioritized list 675. The channel control circuitry re-prioritizes the code words in the prioritized list 675 as incoming code words enter the data transfer channel and outgoing code words leave the data transfer channel. The channel control circuitry may allocate decoders to the channel by disabling or enabling decoders in response to changes in work flow.

Figure 7:
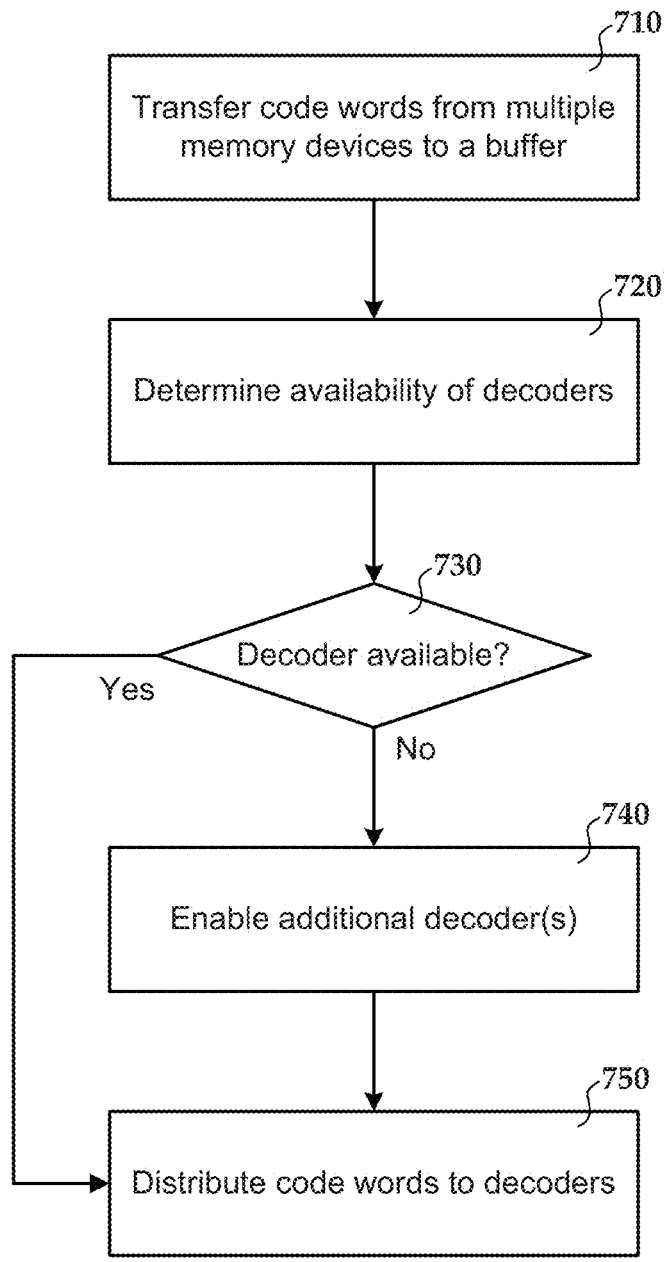
FIG. 7 is a flow diagram illustrating allocation of decoders in a data transfer channel in accordance with some embodiments.

FIG. 7 is a flow diagram illustrating allocation of decoders in a data transfer channel. Multiple code words are transferred 710 from multiple memory devices to a buffer. The channel control circuitry determines 720 if there are a sufficient number of decoders available to decode the incoming code words within the target latencies of the code words. If not 730, one or more additional decoders may be enabled 740. If no additional decoders are available, data transfers into the buffer may be stopped until a decoder becomes available.

Enabling the one or more additional decoders can involve bringing the decoders out of light sleep mode, out of deep sleep mode, or out of shut off mode. During times that decoders are disabled, the channel control circuitry can be arranged to keep at least some of the decoders e.g., a first predetermined number of decoders, in light sleep mode so that they can be very quickly enabled and put to work. If work flow requirements are sufficiently low such that decoders in excess of the first predetermined number can be disabled, the channel control circuitry can be arranged to keep a second predetermined number of decoders in deep sleep. If work flow requirements are sufficiently low such that additional decoders in excess of the first predetermined number and the second predetermined number can be disabled, the channel control circuitry can be arranged to place these additional decoders in shut off mode.

If the channel control circuitry enables a decoder that is in light sleep mode, then it may also bring a disabled controller that is in deep sleep mode into light sleep mode and may bring a disabled decoder that is in shut off mode into deep sleep mode to maintain the first and second predetermined numbers.

If a sufficient number of decoders are available 730 the channel control circuitry distributes 750 code words to the available decoders.

In various embodiments, all or part of the data transfer channel system, including the data transfer channel and channel control circuitry, may be implemented in hardware. In some embodiments, all or part of the data transfer channel system may be implemented in firmware, software running on a microcontroller or other device, or any combination of hardware, software and firmware. The techniques described in this disclosure may be implemented, at least in part, in hardware, software, firmware or any combination thereof. For example, various aspects of the described techniques may be implemented within one or more controllers, one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "controller," "processor," or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a non-transitory computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A device, comprising:
a data transfer channel configured to transfer data between multiple memory devices and a host device, the channel comprising:
multiple decoders;
a buffer coupled between the multiple memory devices and the multiple decoders, the buffer configured to store code words received from the memory devices; and
channel control logic configured to:
determine availability of one or more of the multiple decoders;
distribute the code words, in response to prioritization of the code words, to the one or more decoders based on decoder availability.

2. The device of claim 1, wherein there are M decoders and N memory devices and M<N.

3. The device of claim 1, wherein the decoders are low density parity check (LDPC) decoders and a detector is coupled between the buffer and the LDPC decoders.

4. The device of claim 1, wherein the memory devices are non-volatile solid state memory devices.

5. A device, comprising:
a data transfer channel configured to transfer data between multiple memory devices and a host device, the channel comprising:
multiple decoders;
a buffer coupled between the multiple memory devices and the multiple decoders, the buffer configured to store code words received from the memory devices; and
channel control logic configured to:
determine availability of one or more of the multiple decoders;
determine a total estimated latency for each code word using a quality hint received from the host device, the quality hint based on one or more characteristics of the code words or memory locations that store the code words;
determine a target latency for each code word using a priority received from the host device;
prioritize the code words using the total estimated latency and the target latency; and
distribute the prioritized code words to the one or more decoders based on decoder availability.

6. The device of claim 5, wherein the quality information includes one or more of retention time, bit error rate, code rate, and program/erase cycles.

7. The device of claim 5, wherein the channel control circuitry is configured to
determine the total estimated latency for each control word by using the quality hint to access a first look up table of total estimated latencies; and
determine the target latency for each control word by using the priority to access a second look up table of target latencies.

8. The device of claim 1, wherein the channel control logic is configured to enable or disable decoders in response to changes in data transfer workload.

9. The device of claim 8, wherein the disabled decoders are placed in low power mode.

10. A system comprising:
N memory devices;
a data transfer channel configured to transfer data between the multiple memory devices and a host device, the channel comprising:
M decoders, where M<N;
a buffer coupled between the multiple memory devices and the multiple decoders, the buffer configured to store code words from the memory devices; and
channel control logic configured to:
determine availability of one or more of the multiple decoders;
distribute the code words to the one or more decoders based on decoder availability.

11. The system of claim 10, wherein the decoders are low density parity check (LDPC) decoders and a detector is coupled between the buffer and the LDPC decoders.

12. The system of claim 10, wherein the memory devices are non-volatile solid state memory devices.

13. The system of claim 10, wherein the channel control circuitry in configured to distribute the code words in response to prioritization of the code words.

14. A method, comprising:
transferring code words from N memory devices to a buffer;
determining availability of one or more of M decoders to decode the code words, where M<N; and
distributing the code words to the one or more decoders in accordance with decoder availability.

15. The method of claim 14, wherein distributing the code words comprises
determining a total estimated latency for each code word using a quality hint received from the host device, the quality hint based on one or more characteristics of the code words or the memory locations of the memory devices that store the code words;
determining a target latency for each code word using a priority received from the host device;
prioritizing the code words using the total estimated latency and the target latency; and
distributing the prioritized code words to the available decoders.

16. The method of claim 15, wherein the quality information includes one or more of retention time, bit error rate, code rate, and number or program/erase cycles.

17. The method of claim 14, further comprising activating additional decoders to meet a target latency for one or more code words.

18. The method of claim 14, further comprising deactivating additional decoders in response to a decrease in data transfer workload.

19. The method of claim 18, further comprising placing disabled decoders in a low power mode.

20. The method of claim 14, further comprising decoding the code words using the available decoders, wherein some of the decoders perform hard decoding and some of the decoders perform soft decoding.

* * * * *